United States Patent
Gudmestad

[11] 3,807,025
[45] Apr. 30, 1974

[54] METHOD FOR MAKING INDICIA BEARING LIGHT CONDUCTORS

[75] Inventor: Ragnar Gudmestad, West Allis, Wis.

[73] Assignee: Artos Engineering Company, New Berlin, Wis.

[22] Filed: Mar. 9, 1973

[21] Appl. No.: 339,599

[52] U.S. Cl............ 29/412, 101/9, 101/27, 101/32, 350/96 B, 350/320
[51] Int. Cl............................. B23p 17/00
[58] Field of Search......... 29/412; 219/68; 350/320, 350/96 B; 83/151, 277; 101/9, 10, 11, 21, 27, 30, 32

[56] References Cited
UNITED STATES PATENTS

| | | | |
|---|---|---|---|
| 3,029,494 | 4/1962 | Andren | 83/151 |
| 3,198,059 | 8/1965 | Phaneuf et al. | 350/96 B |
| 3,585,705 | 4/1972 | Allan | 29/412 |
| 3,655,275 | 4/1972 | Seagreaves | 350/96 B X |

*Primary Examiner*—Charles W. Lanham
*Assistant Examiner*—Victor A. DiPalma
*Attorney, Agent, or Firm*—James E. Nilles

[57] ABSTRACT

Automated measuring, cutting and conveying equipment provides successive lengths of fiber optical ribbon and advances them step by step to automated processing equipment which during successive periods of temporary standstill of the conveying equipment attaches fiber gathering ferrules to the opposite ends of each ribbon; provides each ribbon with opposite light admitting and emitting end faces; imprints longitudinally spaced indicia upon each ribbon; severs each ribbon between the indicia; and heat seals the free ends of the severed ribbon parts.

7 Claims, 13 Drawing Figures

METHOD FOR MAKING INDICIA BEARING LIGHT CONDUCTORS

BACKGROUND OF THE INVENTION

The invention relates to flexible fiber optical light conductors, that is, to fiber optical ribbons which have the ability to transmit light from one end toward the other regardless of turns, twists or other tortuous shapes to which they might be subjected.

In order to prepare a length of fiber optical ribbon for use as a light conductor it has heretofore been proposed to attach a fiber gathering ferrule to at least one end of the ribbon and to trim the ferrule and the ribbon fibers therein so as to provide the ribbon with a plane light admitting and emitting end face. Light conductors of this type have found wide practical use, particularly in the automotive industry, and in order to satisfy the enormous demand for them automated equipment has heretofore been developed which is capable of producing such light conductors in large numbers and at a relatively high rate of speed, such as over a thousand per hour. In this connection, reference may be had to my copening U.S. Pat. application Ser. No. 326,380, filed on Jan. 24, 1973, Pat. No. 3,789,485 for "Method and Apparatus for Producing Flexible Fiber Optical Light Conductors."

The apparatus disclosed in the mentioned application comprises automated measuring, cutting and conveying equipment which provides successive lengths of fiber optical ribbon and which advances the cut ribbons, step by step toward a collecting trough. The apparatus further comprises automated processing equipment which during successive periods of temporary standstill of the conveying equipment attaches a fiber gathering ferrule to the ribbon at one of its ends or, if desired, at both ends, and which also provides each ribbon with a plane light admitting and emitting end face at the ferrule or ferrules. The light conductors thus produced by the mentioned earlier apparatus may vary as to width and length, the apparatus being readily adjustable to increase and decrease the length of the produced light conductors. If it is adjusted for the production of short light conductors its production capacity is greater than for long light conductors, and vice versa.

SUMMARY OF THE INVENTION

The principal object of the present invention is to provide ribbon type fiber optical light conductors which have identifying indicia, such as a part number, stamped upon their ribbons.

To that end the invention contemplates to utilize equipment which is fully automated to produce ribbon type fiber optical light conductors each provided with a fiber gathering ferrule and a light admitting and emitting end face at each end, and additional fully automated processing equipment by means of which the ribbon of the thus produced light conductor is provided with spaced indicia and cut in two between the indicia, thereby providing a pair of light conductors each having a fiber gathering ferrule and a light admitting and emitting end face at one end, and identifying indicia, such as a part number, on its ribbon.

More specifically, it is an object of the present invention to provide automated equipment for severing fiber optical light conductors of the above mentioned character incorporating a cutting element which is heated to ribbon melting temperature and heat seals the free ends of the severed ribbon during the severing operation.

A further object of the invention is to provide automated equipment for applying identifying indicia to fiber optical light conductors of the above mentioned character incorporating indicia printing type which is heated to ribbon softening temperature so that the indicia will be permanently impressed into the ribbon during the printing operation.

A further object of the invention is to provide indicia printing equipment of the above outlined character which also colors the imprinted indicia for easy reading.

A further object of the invention is to provide an improved method of mass producing ribbon type fiber optical light conductors having a fiber gathering ferrule and light admitting and emitting end face at one end only.

These and other objects and advantages of the invention will become apparent from the following description of a preferred embodiment of the invention shown in the accompanying drawings.

DETAILED DESCRIPTION

Figure 1:
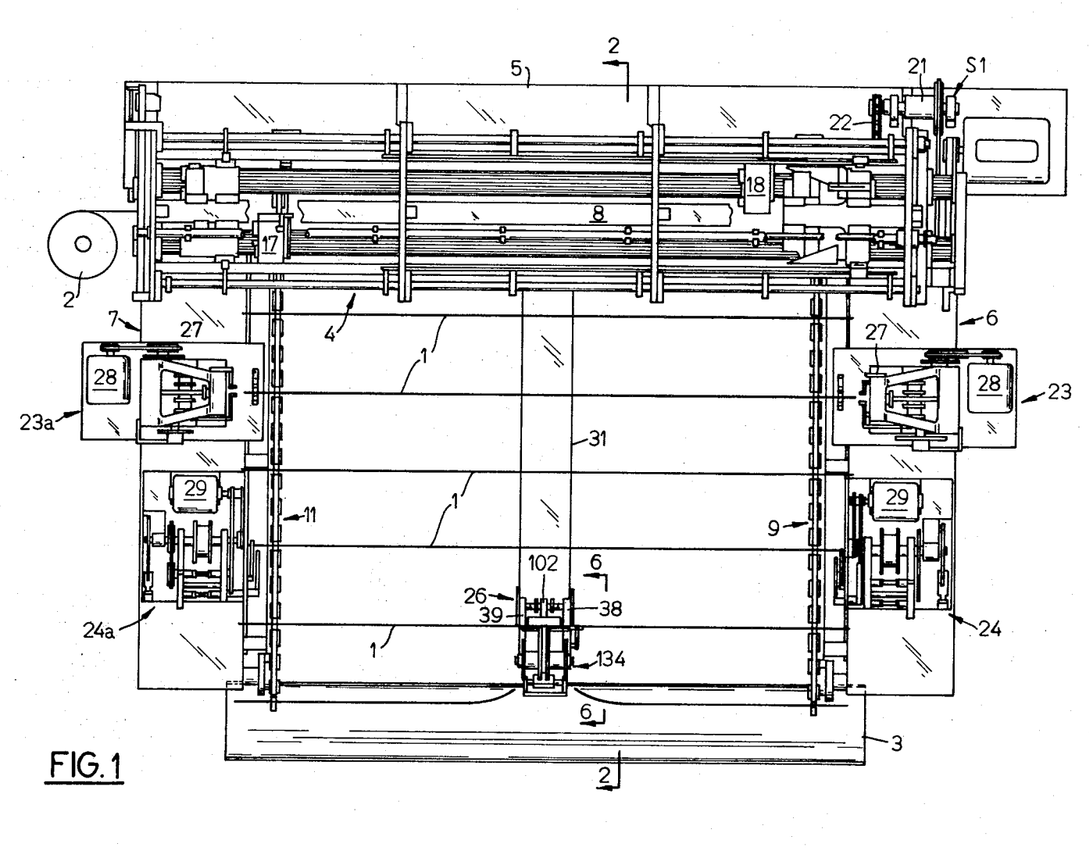
FIG. 1 is an overall plan view of an apparatus for producing fiber optical light conductors in accordance with the invention.

The apparatus shown in FIG. 1 performs generally four principal operations; namely, it pulls lengths of fiber optical ribbon 1 from a supply reel 2 and after cutting, conveys them sidewise step-by-step to a collecting trough 3; it attaches a fiber gathering ferrule to each end of each ribbon; it trims both ends of each ribbon so as to provide the ribbon with plane, light admitting and emitting end faces (FIG. 3); and it stamps identifying indicia upon each ribbon and cuts it in two (FIG.4), thereby producing a pair of fiber optical light conductors each having a fiber gathering ferrule and a light admitting and emitting end face at one end and indicia, such as a part number, stamped upon it at its other end.

The operation of pulling lengths of ribbon 1 from the supply reel 2 and of conveying them step-by-step to the collecting trough 3 is performed by a portion of the machine which in FIG. 1 is generally designated by the reference character 4. It comprises a transverse frame section 5, side frame sections 6 and 7; a ribbon length measuring and cutting mechanism 8 on the frame section 5 and a pair of parallel ribbon transfer conveyors 9 and 11 between the side frames 6 and 7.

Figure 2:
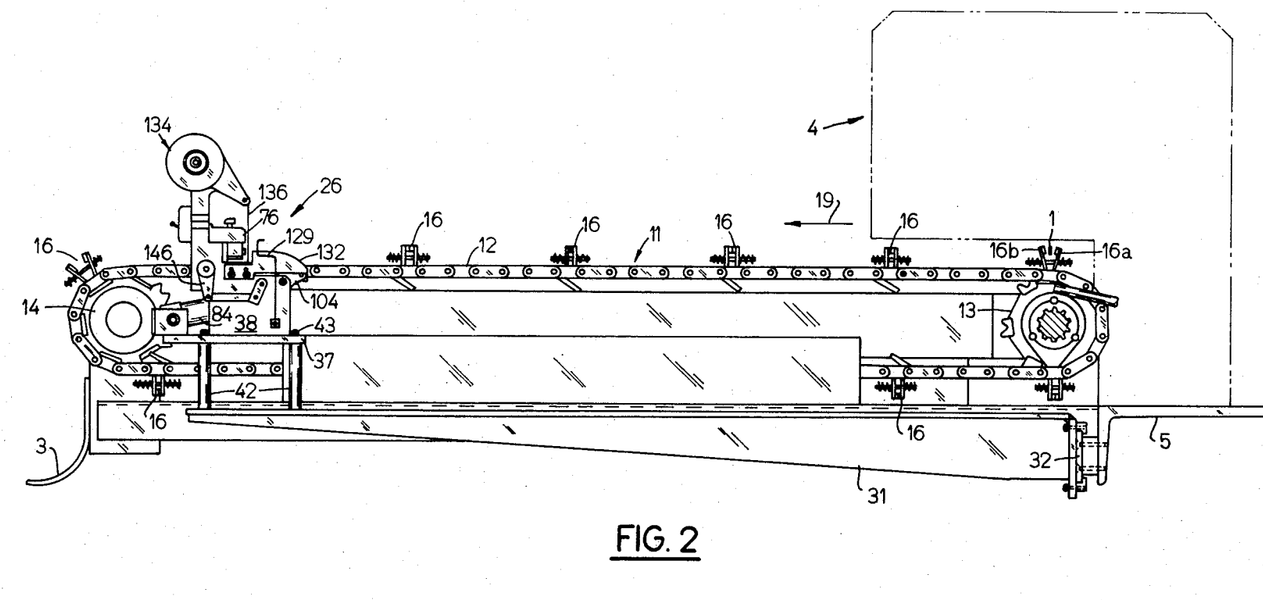
FIG. 2 is an enlarged sectional view on line 2—2 of FIG. 1.

As shown in FIG. 2, the ribbon transfer conveyor 11 comprises an endless chain 12 and associated driving and idler sprockets 13 and 14. A series of identical ribbon gripping clamps 16 are mounted on chain 12 at equal spacings from each other. As the chain is moved in the direction of arrow 19 by anti-clockwise rotation of the drive sprocket 13 as viewed in FIG. 2, complementary ribbon gripping jaws 16a and 16b of each clamp are successively actuated so as to move to an open ribbon straddling position at the upper periphery of the drive sprocket 13, then to a closed ribbon gripping position in which the clamps move toward the idler sprocket 14, then to a ribbon releasing position at the idler sprocket 14, and then to a reclosed position for travel without a ribbon along the lower run of the chain toward the drive sprocket 13. The ribbon transfer conveyor 9 is a duplicate of the ribbon transfer conveyor 11 and the ribbon gripping clamps on the conveyor 9 are transversely aligned with the ribbon gripping clamps on the conveyor 11.

The ribbon length measuring and cutting mechanism 8 on the frame section 5 includes a pair of counter reciprocating feeding clamps 17 and 18 which alternately pull a desired length of ribbon from the ribbon supply reel 2 and after cutting, drop the ribbon length 1 into a pair of transversely aligned open ribbon gripping clamps 16. The clamps 16 then close and the conveyors 9 and 11 are advanced in unison from standstill in the direction of arrow 19 in FIG. 2 by a fractional rotation of the drive sprocket 13.

Driving power for the sprocket wheel 13 is derived from a one-revolution clutch 21 (FIG. 1) by means of a drive chain 22 and an associated speed reducing mechanism (not shown) which is geared so that the chain conveyors will advance a distance equal to the spacing between successive clamps 16 when the clutch 21 is tripped and its driven shaft revolves through one revolution. Thereafter, the conveyors remain at standstill until a new tripping signal is transmitted to the clutch 21. Suitable provisions are made to trip the clutch whenever a predetermined length of ribbon has been pulled from the supply reel 2 and cut by the measuring and cutting mechanism 8. The length of time required for the ribbon measuring and cutting operation determines the length of the period at which the conveyors remain at standstill between successive advance movements.

Another characteristic feature of the ribbon measuring, cutting and conveying mechanism shown in FIG. 1 is that it can readily be adjusted to increase or decrease the length of the produced ribbon. To that end the side frame 6 may be moved laterally along the transverse frame section 5 to selected positions of transverse spacing from the side frame 7. Such varying of the spacing between the side frames 6 and 7 automatically varies the cycling of the ribbon measuring, cutting and conveying mechanisms as required for the increased or decreased length of the produced ribbon.

For a more detailed description of the ribbon measuring, cutting and conveying apparatus, reference may be had to U.S. Pat. No. 3,701,301, issued on Oct. 31, 1972 to Ragnar Gudmestad for "Wire Lenth Measuring and Cutting Apparatus."

In addition to the ribbon length measuring and cutting apparatus 8 and the ribbon conveyors 9 and 11 the apparatus shown in FIG. 1 incorporates a pair of ferrule attaching units 23, 23a; a pair of ferrule and ribbon trimming units 24, 24a; and an indicia impressing and ribbon severing apparatus 26.

The ferrule attaching units 23, 23a are mounted, respectively in fixed positions on the side frames 6 and 7 in transverse alignment with each other. Their construction and mode of operation is fully disclosed in the hereinbefore mentioned U.S. Pat. No. 3,789,485. Briefly, each of the units 23, 23a comprises a tool slide 27 which is reciprocable transversely to the adjacent conveyor chain; a ferrule feeding and attaching mechanism on the tool slide; and an actuating mechanism including a motor 28. The units 23, 23a are fully automated so as to complete a ferrule attaching cycle during each period of temporary standstill of the conveyors.

The ferrule and ribbon trimming units 24, 24a, like the ferrule attaching units 23, 23a, are mounted respectively on the side frames 6 and 7 in transverse alignment with each other as shown in FIG. 1. The principal components of each of these units are a rotary cutting element which is movable back and forth in the longutudinal direction of the adjacent conveyor; a releasable ferrule clamping mechanism, and an actuating mechanism for the cutting element and ferrule clamping mechanism including a motor 29. As disclosed in the mentioned U.S. patent application, back and forth movement of the rotary cutting element slices a short end portion from the adjacent ferrule and from the enclosed ribbon fibers, ans as a result of such trimming a plane light admitting and emitting end face is formed at each end of the ribbon 1. The units 24, 24a are fully automated so as to complete a ferrule and ribbon trimming cycle during each period of temporary standstill of the conveyors 9 and 11.

The indicia impressing and ribbon severing apparatus 26 as shown in FIG. 1 is positioned midway between the ribbon conveyors 9 and 11 and close to the collecting trough 3. A cantilever support (FIG. 2) for the apparatus 26 comprises an inverted U-shaped tapered beam 31 which extends transversely of the frame section 5 and which is mounted thereon by means of a slideable connection 32 for lateral adjustment along the frame section 5. The apparatus 26 may therefore be kept at equal distances from the conveyors 9 and 11 when the spacing between the conveyors is changed by lateral adjustment of the frame section 6 relative to the frame section 7.

The fiber optical ribbon fed into the apparatus from the supply reel 2 is a commonly known and commercially available product. It comprises a number of continuous lengthwise extending plastic fibers and spaced, parallel cross threads which hold the longitudinal fibers together in a common plane.

Figure 3:
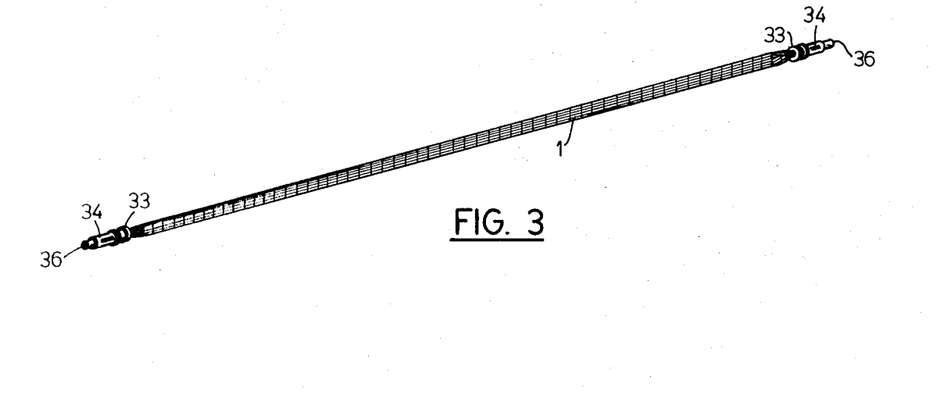
FIG. 3 is a perspective view of a ribbon type fiber optical light conductor.

FIG. 3 illustrates a typical fiber optical light conductor as produced by the ribbon measuring and cutting apparatus 8, the ferrule attaching units 23, 23a, and the trimming units 24 and 24a of the apparatus shown in FIG. 1. The ferrules at the opposite ends of the ribbon 1 each comprise a plastic fiber gathering ferrule sleeve 33 and a surrounding metal ferrule sleeve 34. The ferrule attaching units 23, 23a operate to push a ferrule assembly 33, 34 over each end of the ribbon 1 and to then crimp the metal sleeve 34 radially inward and thereby firmly secure the ferrule assemblies to the opposite ends of the continuous ribbon 1. The trimming units 24, 24a operate to slice a short end piece from each of the plastic ferrule sleeves 33 and from the enclosed ribbon fibers and thereby provide each end of the continuous ribbon 1 with a plane light admitting and emitting end face 36.

Figure 4:
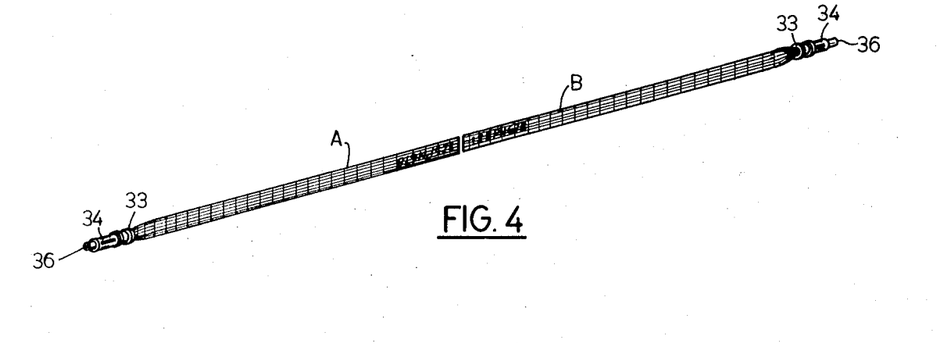
FIG. 4 is a perspective view showing the light conductor of FIG. 3 cut in two and identifying indicia on the cut ribbon parts.
Figure 5:
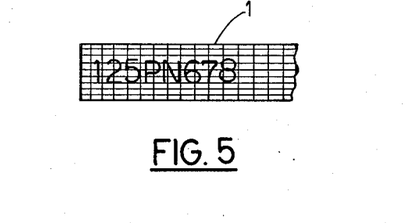
FIG. 5 is an enlarged view of an indicia bearing fiber optical ribbon portion.

FIG. 4 illustrates the light conductor shown in FIG. 3 provided with two series of eight indicia 125PN678 (FIG. 5), and cut in two so as to provide a pair of light conductors A and B, each having a fiber gathering ferrule and a light admitting and emitting end face at one end and identifying indicia at the other.

THE INDICIA IMPRESSING AND RIBBON SEVERING APPARATUS

Figure 6:
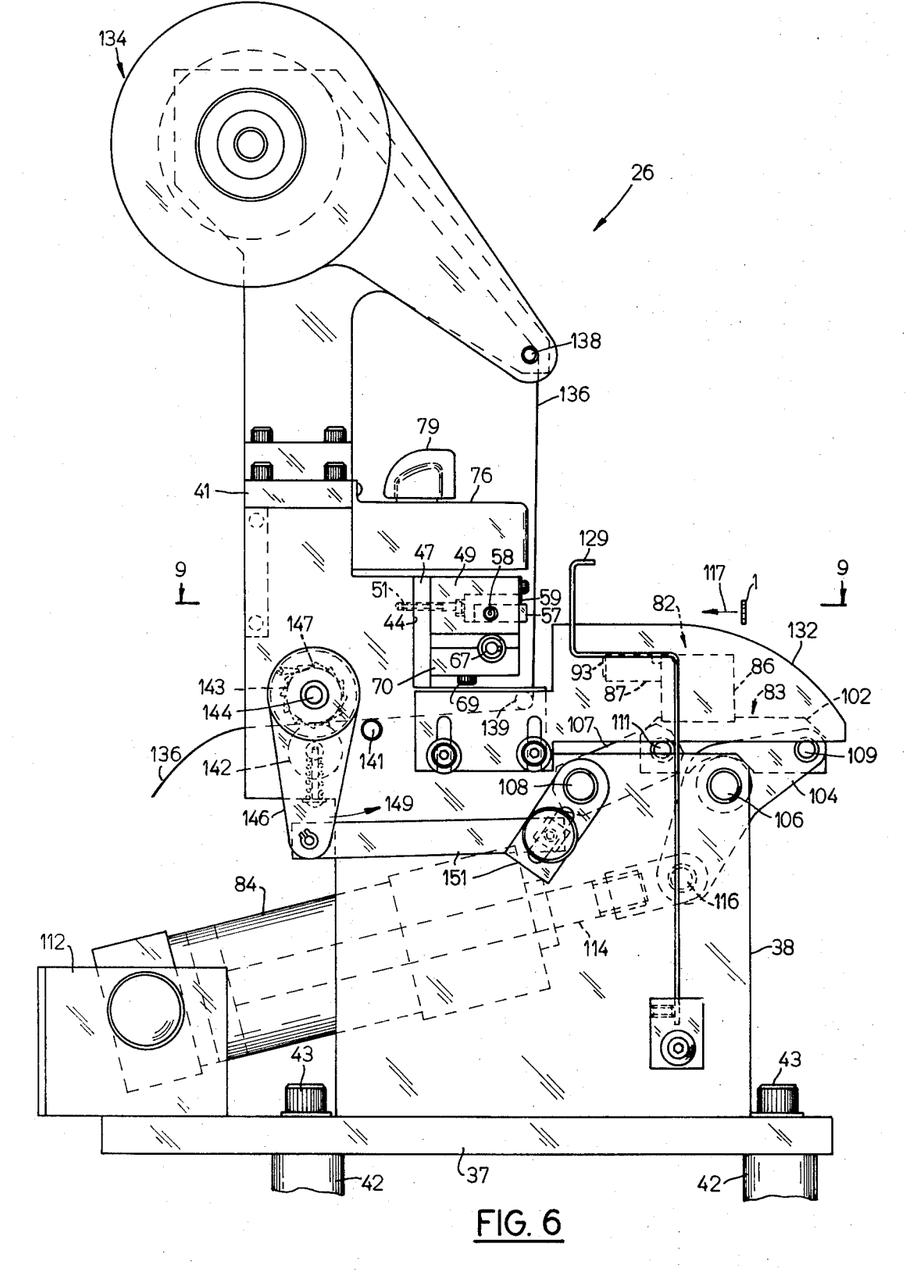
FIG. 6 is an enlarged elevational view on line 6—6 of FIG. 1, showing an indicia impressing and ribbon cutting apparatus.
Figure 7:
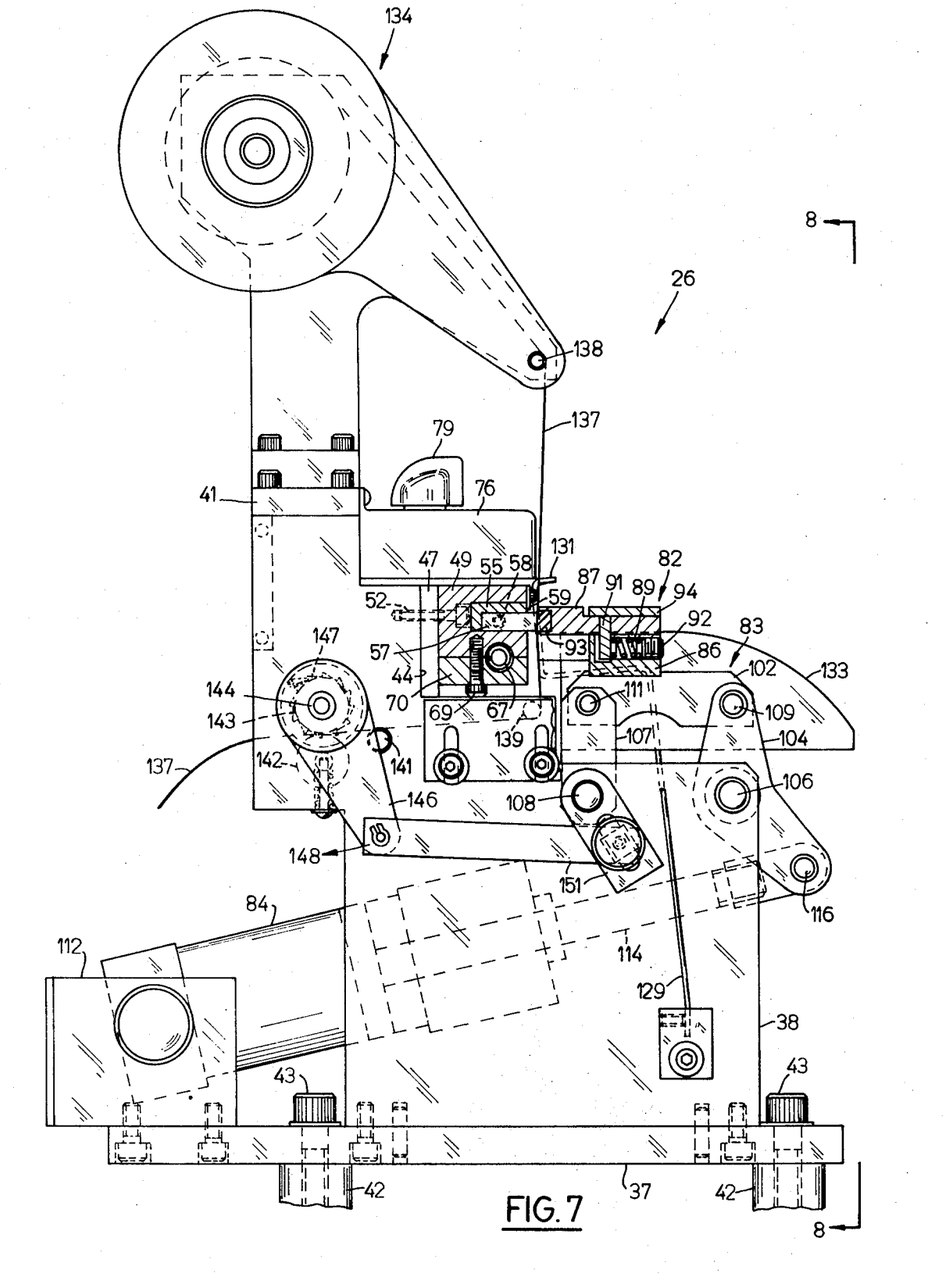
FIG. 7 is a view similar to FIG. 6 but showing the apparatus in a different condition of adjustment, parts being broken away and shown in section on line 7—7 of FIG. 9.
Figure 8:
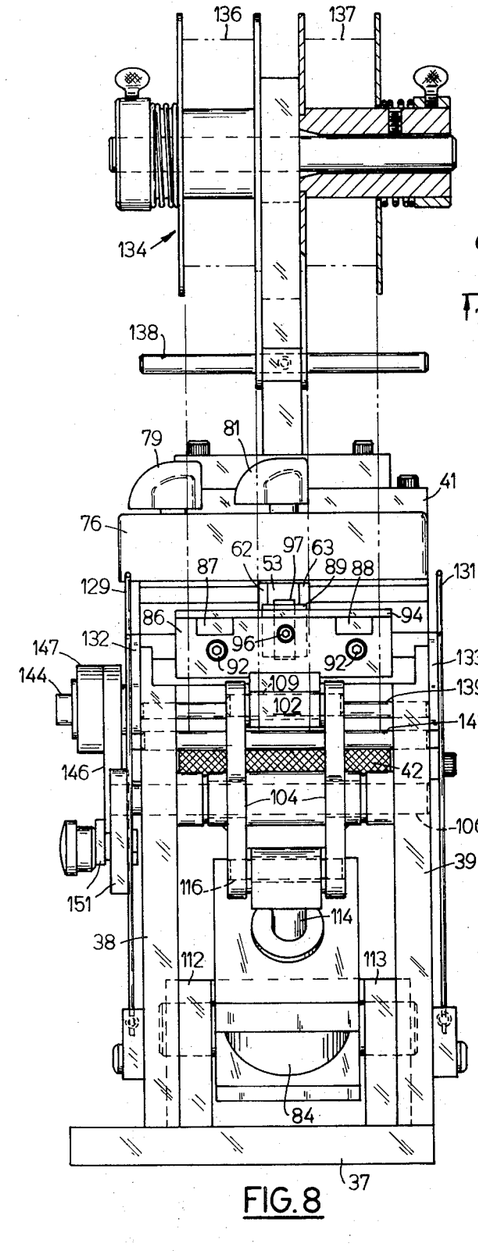
FIG. 8 is an end view on line 8—8 of FIG. 7; with parts broken away and shown in section.

The conversion of the continuous light conductor shown in FIG. 3 into the two individual light conductors A and B shown in FIG. 4 is accomplished automatically during a period of temporary standstill of the conveyors 9 and 11 by operation of the indicia impressing and ribbon severing apparatus 26 at the light conductor discharge end of the apparatus shown in FIG. 1. Referring to FIGS. 6 and 8, a frame assembly of the apparatus 26 comprises a base plate 37, upstanding side plates 38 and 39 secured at their lower ends to the base plate 37 at a fixed transverse spacing from each other, and a top plate 41 extending across and secured to the upper ends of the side plates 38 and 39. As shown in FIG. 2, the base plate 37 extends horizontally at a fixed vertical distance from the free end of the cantilever beam 31, and tubular spacers 42 and connecting bolts 43 rigidly secure the plate 37 to the beam 31. At the ribbon receiving side of the apparatus 26, the side plates 38 and 39 are stepped to provide a horizontally recessed vertical face 44 (FIG. 6) on the side plate 38, and a similar horizontally recessed vertical face 46 (FIG. 9) on the side plate 39. Extending across the side plates 38, 39 and confronting the faces 44 and 46 but separated therefrom by spacers 47 and 48 (FIG. 9) of heat insulating material is an elongated metal block 49 of generally channel shaped cross section as shown in FIG. 7. Cap screws 51 and 52 (FIG.9) extend through opposite end portions of the block 49 and through the heat insulating spacers 47, 48 and are threaded into tapped holes of the side plates 38, 39. In the assembled condition of the apparatus as shown in FIGS. 1 and 2, the block 49 is positioned on generally the same horiziontal level (FIG.2) as the ribbon holding clamps 16 in the upper runs of the conveyors 9 and 11.

Figure 11:
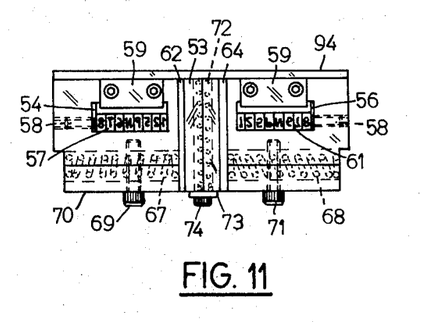
FIG. 11 is a partial elevational view on line 11—11 of FIG. 9.

The block 49 houses an upright cutter plate 53 (FIG.9) midway between the frame side plates 38 and 39, and two type holding boxes 54 and 56 at the opposite sides of the cutter plate 53. The box 54 has opposite endwalls connected by a vertical wall 50 abutting a vertical transverse inner face of the block 49. A top wall 55 (FIG.7) of the box 54 engages a horizontal inner face of the block 49. A pack 57 of eight indicia printing types is compressed between the opposite end walls of the box 54 by a set screw 58 and locked in position by a retainer plate 59 (FIG. 11).

The type holding box 56 is an opposite hand duplicate of the box 54 and contains a pack 61 of eight indicia printing types, the pack 57 producing the indicia shown in FIG. 4 on the light conductor A and the pack 61 producing the indicia on the light conductor B.

The indicia holding boxes 54 and 56 are separated from the cutter plate 53 by strips 62 and 63 of heat insulating material, and the cutter plate 53 is separated from the block 49 by a strip 64 of heat insulating material. The cutter plate 53 is secured to the block 54 by a cap screw 66.

Figure 10:
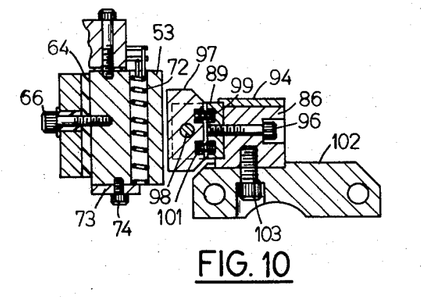
FIG. 10 is an enlarged sectional view on line 10—10 of FIG. 9.

Electrical heating elements 67 and 68 (FIG.11) are mounted at the underside of the block 54 below the type holding boxes 54 and 56, respectively. A bottom plate 70 (FIG. 7) is secured to the underside of the block 49 by cap screws 69 and 71 (FIG. 11) and cylindrical bores accommodating the heating elements 67 and 68 are formed in the adjoining portions of the block 49 and bottom plate 69. A third electrical heating element 72 (FIG. 10) is fitted into a vertical bore of the cutter plate 53 and retained therein by a clip 73 and a cap screw 74. Electrical controls for the heating elements 67, 68 and 72 are mounted within an enclosure 76 supported on the side plates 38, 39 above the block 49. The controls within the enclosure 76 include a thermostatic relay 77 (FIGS. 12 and 13) for the heating elements 67, 68 and a thermostatic relay 78 for the heating element 72. The relays 77 and 78 are manually adjustable by rotatable knobs 79, 81 (FIG. 8) on top of the enclosure 76.

The indicia characters of the types in packs 57 and 61 are formed in relief, and in the assembled condition of the apparatus the ribbon engaging faces of the types are aligned in a vertical plane extending transversely of the conveyors 9 and 11. The ribbon engaging side of the cutter plate 53 has bevelled end faces converging at a substantially right angle toward each other to form a vertical cutting edge between the type packs 57 and 61.

A mechanism for pressing fiber optical ribbons against the type packs 57, 61 and against the cutting edge of the cutter plate 53 comprises a platen assembly 82, a parallel linkage system 83, and a double acting pneumatic cylinder 84. The platen assembly comprises an elongated base block 86 which mounts a pair of generally T-shaped ribbon push slides 87 and 88 (FIG. 9) and a clevis 89 midway between the push slides 87 and 88. The stem of the push slide 87 is guided in a transverse recess at the upper side of the base block 86 for endwise back and forth movement transversely of the block 86, and a coil spring 89 (FIG. 7) reacts between a depending stud 91 on the push slide 87 and a screw plug 92 in the base block 86 so as to yieldingly maintain the slide 87 in a projected position at the ribbon engaging side of the platen assembly 82. The ribbon engaging end of the push slide 87 is faced with a pad 93 of elastically deformable heat resisting material such as silicone rubber.

Figure 9:
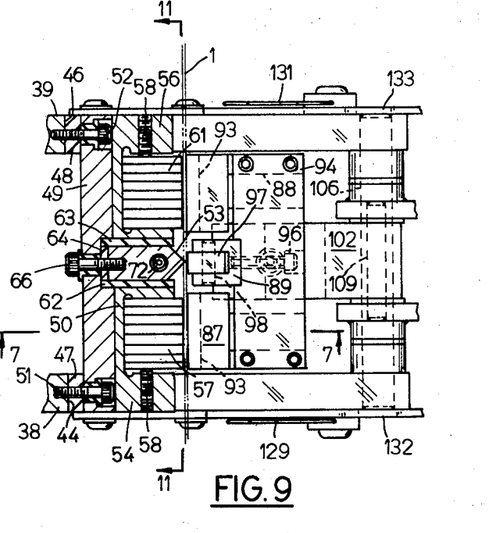
FIG. 9 is a partial top view of the apparatus shown in FIG. 6, with parts broken away and shown in section on line 9—9 of FIG. 6.

The foregoing explanations regarding the ribbon push slide 87 analogously apply to the ribbon push slide 88 (FIG. 9). A cover plate 94 (FIG.8) is secured to the upper side of the base block 86 to retain the push slides 87, 88 in the guide recesses of the base block.

The clevis 89 (FIG.9) is secured to the base block 86 by a cap screw 96 (FIG. 10) and the prongs of the clevis straddle an anvil block 97 which is rockably supported on a cross pin 98 and serves as a backing element for the cutter plate 53. Coil springs 99 and 101 react between the clevis 89 and the anvil block 97 to yieldingly maintain it in a vertical direction.

The platen assembly 82 is supported on a floating horizontal link 102 (FIG. 6) of the parallel linkage system 83. The base block 86 (FIG.10) is fitted into a cross groove at the upper side of the link 102 and is secured in position by a cap screw 103. Parallel supporting links for the horizontal link 102 are provided by a lever assembly 104 which is pivoted between the side plates 38, 39 on a cross shaft 106, and by a lever assembly 107 which is pivoted between the side plates 38, 39 on a cross shaft 108. A pivot pin 109 connects a pair of upper arms of the lever assembly 104 with one end of the horizontal link 102, and a pivot pin 111 (FIG. 7) similarly connects the lever assembly 107 with the other end of the link 102.

The double acting pneumatic cylinder 84 is mounted at its barrel end between bearing blocks 112, 113 (FIG. 8) on the base plate 37 for swinging movement on a horizontal transverse axis. The piston rod 114 of the cylinder 84 is connected to a pair of depending arms of the lever assembly 104 by means of a pivot pin 116.

FIG. 6 shows the cylinder 84 in its contracted limit position which places the parallel linkage system 83 into a collapsed condition and the platen assembly 82 into a retracted, lowered position in which it is cleared by a ribbon 1 advancing horizontally in the direction of arrow 117 toward the indicia printing packs 57, 61 and cutter plate 53.

FIG. 7 shows the cylinder 84 in its expanded limit position which places the parallel linkage system 83 into an unfolded condition and the platen assembly 82 into an indicia impressing and ribbon severing position.

Figure 12:
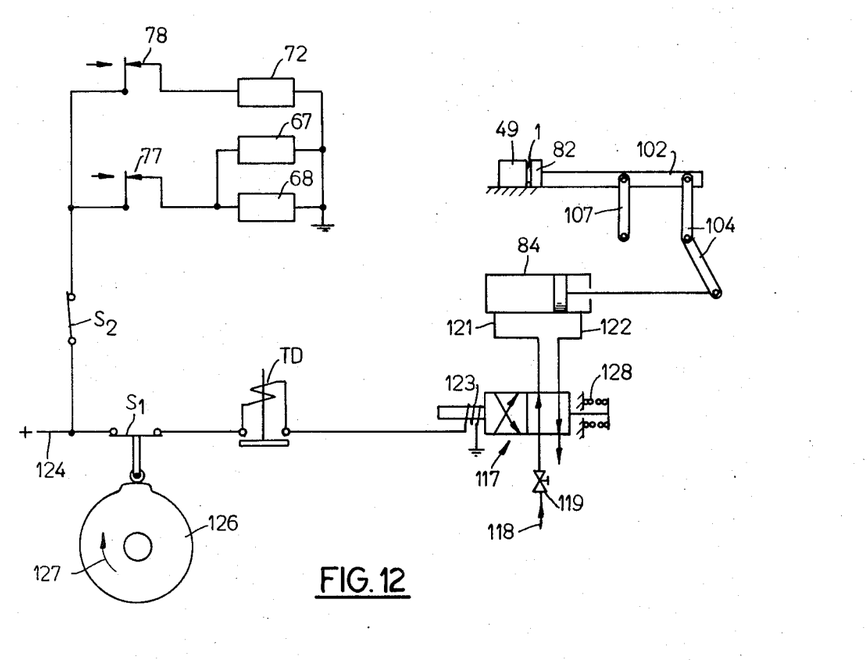
FIGS. 12 and 13 are electro-pneumatic circuit diagrams for the apparatus shown in FIGS. 6-10.
Figure 13:
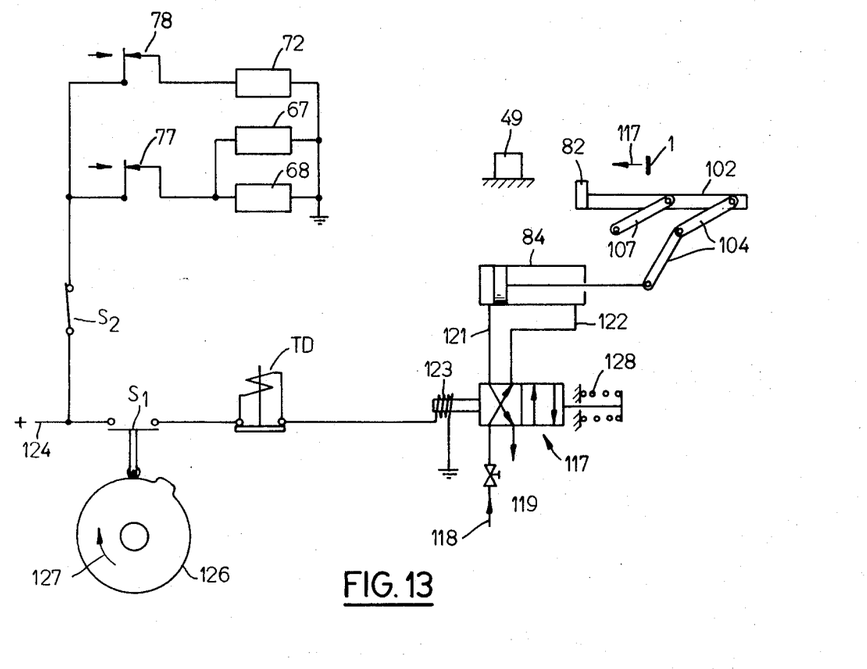

Contraction and expansion of tthe cylinder 84 is controlled by a four-way spring biased solenoid operated air valve 117 as shown in FIGS. 12 and 13. An air supply line 118 for the solenoid valve includes a manually adjustable air flow control 119 and conduits 121 and 122 connect the solenoid valve with the barrel end and gland end, respectively of the cylinder 84. The solenoid coil 123 is grounded at one end and at its other end is connected with a current supply line 124 via a time delay relay TD and a cam operated line switch $S_1$. The cam disc 116 of the switch $S_1$ is keyed to the output shaft of the one-revolution clutch 21 (FIG.1) in a rotatively fixed position which places the switch $S_1$ in a closed position (FIG. 12) while the output shaft of the clutch 21 is at rest and the ribbon conveyors 9 and 11 are at standstill. Current flowing through the closed switch $S_1$, open delay relay TD and solenoid coil 123 causes the valve 117 to shift in opposition to its spring bias into the cylinder expanding position in which it is shown in FIG. 12. The platen assembly 82 is therefore kept in its indicia impressing and ribbon severing FIG. 7 position while the conveyors 9 and 11 are at standstill.

When a trip signal is transmitted to the one-revolution clutch 21 (FIG.1) by the ribbon measuring and cutting mechanism 8, the cam disc 126 is rotated in the direction of arrow 127 through one revolution from the position in which it is shown in FIG. 12. As the driven shaft of the one-revolution clutch 21 starts rotating the conveyors 9 and 11 begin to move, the switch $S_1$ opens, and the relay TD is reset, as shown in FIG. 13.

Consequently, the solenoid coil 123 becomes de-energized and the solenoid spring 128 causes the valve 117 to shift into the cylinder contracting position in which it is shown in FIG. 13. The platen assembly 82 is therefore kept in its retracted ribbon clearing position in which it is shown in FIG. 6 while the ribbon conveyors 9 and 11 are moving.

As the driven shaft of the one-revolution clutch 21 rotates through the final part of a full revolution, the ribbon 1 which has previously been trimmed by the trimming units 24, 24a (FIG.1) approaches the indicia printing packs 57, 61 (FIG.9) and ribbon cutter plate 53. At the same time the cam disc 126 approaches its switch closing position. When the conveyors 9 and 11 stop the advancing ribbon 1 has moved nearly or fully into contact with the printing packs 57, 61 and cutter plate 53, and after a brief delay as determined by the setting of the time delay relay TD the platen 82 moves into its operative position in which it is shown in FIG. 7. The pressure of the coil psrings 89 (FIG. 7) causes the indicia to be impressed upon the ribbon, and the air pressure in the barrel end of the cylinder 84 causes the ribbon to be cut in two by the cutter plate 53.

The indicia printing packs 57 and 61 (FIG.9) are brough to a ribbon softening temperature by electrical current flowing from the supply line 124 (FIG. 12) to the heating elements 67, 68 through a closed line switch $S_2$ and the thermostatic relay 77.

The cutter plate 53 (FIG. 9) is brought to a ribbon melting temperature by electrical current flowing from the closed switch $S_2$ through th thermostatic relay 78.

While the ribbon 1 is engaged by the platen assembly 82, the indicia characters are permanently impressed into it by the heated printing packs 57 and 61, and the cut ends of the conductors A and B (FIG.4) are heat sealed by the converging end faces of the cutter plate 53. A new trip signal for the one-revolution clutch 21 then opens the switch $S_1$ so that the platen assembly 82 will be swung into its FIG. 6 ribbon clearing position. As the conveyors 9 and 11 advance in response to the new trip signal they carry the completed light conductors A and B (FIG.4) toward the collecting trough 3, and as the conveyors travel around the sprockets 14 (FIG.2) they drop the conductors into the trough.

In order to facilitate separation of the ribbon portions of the conductors A and B from the heated printing packs 57, 61, a pair of ribbon engaging wire springs 129 and 131 (FIGS. 7 and 8) are mounted at the outer sides of the frame side plates 38 and 39, and in laterally spaced relation to the printing packs 57 and 61. These springs extend transversely to the path of movement of the platen assembly 82 and are deflected, as shown in FIG. 7, by the ribbon 1 moving toward the printing packs and cutter plate. When the cylinder 84 contracts and the platen assembly 82 swings toward its ribbon clearing position, the springs 129 and 131 return from their deflected FIG. 7 position to their relaxed FIG. 6 position, and in doing so exert pull on the severed ribbon portions away from the printing packs 57 and 61.

Also mounted at the outer sides of the frame side plates 38 and 39 are a pair of ribbon guide plates 132, 133 on which the mid-portion of a continuous ribbon 1 may ride during its movement toward the printing packs 57, 61 and cutter plate 53.

For easy reading of the indicia on the conductors A and B (FIG.4) the impressed indicia are colored by means of coloring foil which is presented to the printing packs 57, 61 before the continuous ribbon 1 is pressed against them by the platen assembly 82. to that end a bracket assembly 134 carrying reels of coloring foil 136 and 137 (FIG.8) is mounted on the frame plate 41. The foil 136 (FIG.6) is guided over a cross pin 138 of the bracket assembly 134 to a cross pin 139 between the frame side plates 38, 39, and from there over another cross pin 141 between the side plates into the nip of a pair of feed rollers 142 and 143 between the side plates 38, 39. The lower feed roller 142 is spring supported at its opposite ends and yieldingly bears against the upper roller 143 which has a drive shaft 144 journalled in the side plates 38, 39. A rocker arm 146 at the outer side of the frame plate 39 is supported on a projecting end portion of the drive shaft 144 and is freely rotatably thereon. A ratchet mechanism 147 is operatively interposed between the shaft 144 and rocker arm 146 to provide a one-way driving connection which rotates the shaft 144 in ribbon feeding direction when the rocker arm 146 is swung in the direction of arrow 148 in FIG. 7, and which permits the feed roller 143 to stand still when the rocker arm 146 swings in the direction of arrow 149 in FIG. 6. A link 151 connects the rocker arm 146 with a depending arm 151 on the shaft 108. The pivot connection between the link 151 and the depending arm 151 is adjustable radially of the shaft 108, to vary the stroke of the rocker arm 146.

An expanding stroke of the pneumatic cylinder 84 swings the rocker arm 146 from its FIG. 6 position to its FIG. 7 position and leaves the feed rollers 142, 143 at rest. On the other hand, a contracting stroke of the cylinder 84 swings the rocker arm 146 from its FIG. 7 position to its FIG. 6 position and thereby causes a partial rotation of the feed rollers 142, 143 in ribbon feeding direction. Thus, a new portion of the coloring foil 136 is presented to the indicia printing pack 57 with each movement of the platen assembly 82 from its indicia impressing and ribbon severing FIG. 7 position to its ribbon clearing FIG. 6 position.

The foregoing explanations regarding the feeding of the coloring foil 136 analogously apply to the feeding of coloring foil 137. The guide pins 138, 139 and 141 direct the foil 137 past the indicia printing pack 61 into the nip between the feed rollers 142, 143, and whenever the foil 136 is advanced, the foil 137 is advanced an equal amount by the feed rollers 142, 143.

I claim:

1. The method of making indicia bearing light conductors which comprises the steps of providing a length of fiber optical ribbon; attaching a pair of fiber gathering ferrules to and trimming opposite ends, respectively, of said ribbon; pressing a portion of said ribbon intermediate said ferrules against indicia printing type heated to a ribbon softening temperature; maintaining said intermediate ribbon portions for a predetermined length of time in contact with said heated printing type; and removing said intermediate ribbon portion from said heated printing type.

2. The method set forth in claim 1 and further comprising partial color coating of said intermediate ribbon portion while it is maintained in contact with said heated printing type.

3. The method set forth in claim 1 and further comprising the step of presenting coloring foil to said heated indicia printing type before said intermediate ribbon portion is pressed thereagainst.

4. The method of making indicia bearing light conductors which comprises the steps of providing a length of fiber optical ribbon; attaching a pair of fiber gathering ferrules to and trimming opposite ends, respectively, of said ribbon; providing a portion of said ribbon intermediate said ferrules with indicia spaced from each other in the longitudinal direction of said ribbon; and severing said ribbon between said indicia.

5. The method of making indicia bearing light conductors which comprises the steps of providing a length of fiber optical ribbon; attaching a pair of fiber gathering ferrules to and trimming opposite ends, respectively, of said ribbon; severing said ribbon by pressing a portion thereof intermediate said ferrules against a cutting edge heated to a ribbon melting temperature; simultaneously pressing longitudinal portions of said ribbon at opposite sides, respectively of said intermediate portion against indicia printing packs; and removing the severed ribbon portions from said printing packs.

6. The method of making indicia bearing light conductors which comprises the steps of providing a length of fiber optical ribbon; attaching a pair of fiber gathering ferrules to and trimming opposite ends, respectively of said ribbon; severing said ribbon by pressing a portion thereof intermediate said ferrules against a cutting edge heated to a ribbon melting temperature; simultaneously pressing longitudinal portions of said ribbon at opposite sides, respectively, if said intermediate portion against indicia printing packs heated to a ribbon softening temperature; maintaining said longitudinal ribbon portions for a predetermined length of time in contact with said heated printing packs and removing the severed portions of said ribbon from said printing packs.

7. The method set forth in claim 6 and further comprising coloring the indicia impressed upon said longitudinal ribbon portions by applying coloring matter thereto while said longitudinal ribbon portions are maintained in contact with said heated printing packs.

* * * * *